United States Patent [19]

Strauch et al.

[11] 4,279,661
[45] Jul. 21, 1981

[54] MINERAL FILLER, METHOD OF PREPARATION AND USE THEREOF

[76] Inventors: Dieter Strauch, Kanalweg 24, CH-4800 Zofingen; Peter Belger, Juraweg 4, CH-4812 Mühlethal, Switzerland

[21] Appl. No.: 9,570

[22] Filed: Feb. 5, 1979

[30] Foreign Application Priority Data

Feb. 27, 1978 [DE] Fed. Rep. of Germany ....... 2808425

[51] Int. Cl.³ .................... C09C 1/02; C01F 5/140; C01F 11/18
[52] U.S. Cl. ................ 106/288 B; 106/306; 423/328; 423/430; 423/431; 423/432; 423/554
[58] Field of Search ............... 423/430, 431, 432, 328, 423/554; 106/288 B, 306

[56] References Cited

U.S. PATENT DOCUMENTS

| | | | |
|---|---|---|---|
| 3,268,388 | 8/1966 | Bauman et al. | 423/432 |
| 3,340,003 | 9/1967 | Judd | 423/430 |
| 3,920,800 | 11/1975 | Harris | 423/432 |
| 3,940,550 | 2/1976 | Delfosse et al. | 106/288 B |
| 3,954,957 | 5/1976 | Koenig | 106/288 B |
| 3,956,007 | 5/1976 | Modly | 106/288 B |
| 3,962,116 | 6/1976 | Bloching et al. | 106/288 B |
| 4,010,242 | 3/1977 | Iler et al. | 106/288 B |
| 4,015,973 | 4/1977 | Perrine | 423/430 |
| 4,021,263 | 5/1977 | Rosenblum | 106/288 B |
| 4,032,504 | 6/1977 | Lee, Jr. et al. | 106/288 B |
| 4,133,694 | 1/1979 | Bertorelli et al. | 106/288 B |
| 4,155,769 | 5/1979 | Almagro | 106/288 B |
| 4,159,312 | 6/1979 | Shibazaki et al. | 423/430 |
| 4,170,658 | 10/1979 | Skinner et al. | 106/288 B |

FOREIGN PATENT DOCUMENTS 1309074 3/1973 United Kingdom .

OTHER PUBLICATIONS

Kittel, Pigments (Herstellung, Eigenschaften, Anwendung) [Pigments-Production, Properties Uses], Wiss. Verlagsges, m.b.H., Stuttgart, 1960, p. 171, para. 2.
Whiting and Industrial Powders Research Council, Technical Note, No. 101, (1964), para. on Fineness.
Brooks, Tappi Monograph Series 19, (1958), No. 7, p. 26, para. on Gloss.
"Influence of Grain Size Distribution of Extenders on Gloss and Film Formation in Baking Enamel, [Lacquer]", Farbe und Lack [Paint Lacquer], Jun. 1974, pp. 517-523.
Casey, "Pulp and Paper", vol. III (1961), p. 1618.
China-Clay Trading Co. (Bassermann and Grolman GmbH & Co.), Streicherei-Information, 2/66, [Coating Bulletin], p. 6, FIG. 8, and p. 7, para. 2.
McDonald, Bingham, Technical Association Papers (Tappi), Jun. 1946, p. 64, FIGS. 5, 16 & 17.
Sr. Engr. Hentschel, Chemische Technologie der Zellstoff und Papier-Herstellung [Chemical Technology of Cellulose and Paper Production], VEB Fachbuchverlag Leipzig, (1967), p. 101, para. 2.

*Primary Examiner*—Helen M. McCarthy
*Assistant Examiner*—Mark Bell
*Attorney, Agent, or Firm*—Pollock, Vande Sande & Priddy

[57] ABSTRACT

Mineral filler such as calcium carbonate, having at most 15% by weight of particles which are smaller than 0.2 μm with a corresponding spherical diameter, method of preparation, and use thereof are provided.

10 Claims, No Drawings

MINERAL FILLER, METHOD OF PREPARATION AND USE THEREOF

TECHNICAL FIELD

The present invention relates to a mineral filler and especially a novel natural calcium carbonate. The present invention is also directed to the preparation of and use of the mineral fillers.

Mineral fillers are relatively cheap substances which can be added to such raw materials as paints, paper, synthetic materials, and the like, in order to increase their volume and/or weight. Also mineral fillers are often added to improve the technical usefulness of such raw materials.

Filler materials must generally be ground up so that they can be made suitable for the various possible uses. One example of a use of composition containing fillers is for coating paper. Coated paper is coated with a composition which essentially contains a glue or binder and a pigment in the form of a mineral filler. A description of the components of paper coating materials and their application can be found in the book by James P. Casey, "Pulp and Paper Chemistry and Technology", Chapter XIX, Volume III, 1961. The binder used can, for example, consist of starch, casein, or a synthetic latex. The specially used binder for example depends on the pressure method applied. For example, offset lithography requires a binder that is insoluble in water. In general, the pigment contains kaolin as the main component and minor amounts, for example, less than about 20% by weight of one or more components, such as, calcium carbonate, lithopone, barium sulfate, titanium dioxide, talcum, or satin-white.

A group of calcium carbonate pigments, for example, includes naturally occurring materials, such as limestone, marble, chalk, and shells of organisms living in the ocean and along the coastline, for example, seashells (e.g., oyster shells).

The natural chalk pigments, which are normally available commercially tend to form paper coatings with low gloss. This is due to the fact that they throughout contain no more than 35% by weight of particles which are smaller than 2 $\mu$m.

DT-AS (German patent application) No. 1,696,190 suggests a paper coating composition for shiny coating paper wherein the natural chalk is processed so far—by grinding up with sand or a jet mill or by means of classification according to particle size—that it will contain at least 60% by weight of particles which are smaller than 2 $\mu$m with a corresponding spherical diameter and so that it will contain no more than 5% by weight of particles larger than 10 $\mu$m with a corresponding spherical diameter and no more than 0.05% by weight of particles which are larger than 53 $\mu$m.

Quite generally it can be said that the particle size exerts considerable influence on the properties of the products containing the filler, for example, on the gloss of a coated paper. By way of example only are mentioned the following bibliographic references which clearly show that the gloss increases as the percentage or relative amount of very fine particles increases:

1. Casey, Pulp and Paper, Vol. III (1961), page 1618;
2. Brit. Pat. No. 1,309,074 (corresponds to DT-AS No. 2,012,709 and French Pat. No. 2,029,650), Tables I, II, and III;
3. China-Clay Trading Co. (Bassermann & Grolman GmbH & Co.), Streicherei-Information 2166 [Coating Bulletin], page 6, FIG. 8, and page 7, para. 2;
4. McDonald, Bingham, Technical Association Papers (Tappi), June 1946, page 46, FIGS. 5, 16, and 17;
5. Sr. Engr. Hentschel, Chemische Technologie der Zellstoff und Papier Herstellung, [Chemical Technology of Cellulose and Paper Production], VEB Fachbuchverlag Leipzig, (1967), page 101, para. 2;
6. Kittel, Pigments (Herstellung, Eigenschaften, Anwendung) [Pigments—Production, Properties, Uses], Wiss. Verlagsges.m.b.H., Stuttgart, 1960, page 171, para. 2;
7. Whiting & Industrial Powders Research Council, Technical Note No. 101 (1964) para. on Fineness;
8. Brooks, Tappi Monograph Series 19 (1958) No. 7, page 26, para. on Gloss;
9. "Influence of Grain Size Distribution of Extenders on Gloss and Film Formation in Baking Enamel [Lacquer]," Farbe und Lack [Paint and Lacquer], June 1974, pp. 517-523.

Although mineral fillers have been ground up very fine, such still have a negative effect on the quality of products, especially the gloss of paper coating compositions, paints, and lacquers.

It is therefore one purpose of the present invention to avoid these disadvantages and to provide a mineral filler which, in particular when used in paper coating compositions and/or in paints and lacquers, will produce even better properties, and especially improved gloss.

DESCRIPTION OF INVENTION

The present invention is directed to mineral filler which contains at most 15% by weight of particles which are smaller than 0.2 $\mu$m with a corresponding spherical diameter.

The present invention is also directed to preparing the above-described mineral filler by dry or wet grinding, when employing wet grinding optionally drying the wet ground filler, and classifying the filler according to particle size by wind-sifting or by means of wet separation.

The present invention is also directed to the use of the above-defined filler as a filler in glossy paper coating composition and as an extender for glossy lacquers and paints.

Best Mode for Carrying Out Invention

The mineral fillers of the present invention contain as few as possible, but at most 15% by weight of, and most preferably, no particles which are smaller than 0.2 $\mu$m with a corresponding spherical diameter. Especially good results however can be obtained when about 3-12% by weight of particles are smaller than 0.2 $\mu$m with a corresponding spherical diameter. For example, one particular mineral filler revealed outstanding results which contained no more than about 8% by weight of particles which are smaller than 0.2 $\mu$m with a corresponding spherical diameter.

The preferred mineral fillers of the present invention contain about 80 to 95% by weight of particles smaller than one $\mu$m with a corresponding spherical diameter. Also, the preferred mineral fillers of the present invention have a maximum cross-section of 2-3 $\mu$m with a corresponding spherical diameter.

Examples of some mineral fillers of the present invention are natural calcium carbonate, precipitated calcium carbonate, dolomite, kaolin, talcum, barium sulfate, quartz, and mixtures thereof.

It is highly surprising that—contrary to the view held by persons skilled in the art for decades, to the effect that the quality, especially the gloss, for example, of coating paper, increases at the finest of the filler used increases—it has now been found that fine particles, as of a certain degree of fineness, that is to say, finer than 0.2 $\mu$m, cause a deterioration in the properties, especially the gloss.

The following examples are presented to further illustrate the present invention.

EXAMPLE 1

Manufacture of Experimental Products

Natural calcium carbonate was preground in the known manner by means of a jaw crusher and a pinned disk mill. The material thus produced was so classified by means of centrifugal-force wind sifting that the proportion of particles smaller than 1 $\mu$m and the proportion of particles smaller than 0.2 $\mu$m could be varied greatly.

The grain size distribution was measured by means of sedimentation analysis in the centrifugal-force field.

In the above-described manner, two products were produced with a maximum cross-section that would be as identical as possible and, if at all possible, with the same proportion of particles smaller than 1 $\mu$m but with differing proportions of particles smaller than 0.2 $\mu$m.

These products were tested with a paper coating paint for sheet offset printing.

Coating Paint Composition

Binder (acryl acid-ester-containing mixed polymerisate): 13 parts by weight (absolutely dry)

Dispersion agent (Na salt of a polycarbonic acid): 0.6 parts by weight (absolutely dry)

Coating pigment: 100 parts by weight Water: 48 parts by weight

Experimental Conditions

The dispersion of the coating paint was accomplished by means of agitation in a cooled dispersion vessel for 20 minutes. The coating paints were diluted down to about 40% by the addition of water so that a coating application of 12 g/m$^2$ could be achieved by means of manual spreader.

Coating application: 12 g/m$^2$ (manual spreader)
Raw coating paper: 90 g/m$^2$ (no wood)
Drying: drying cabinet, 2 minutes at 105° C.
Satining: 2-roller laboratory calendar 5×at 3,000 kp total pressure and 60° C.

Measurement Conditions

The gloss was measured according to Tappi at a 75° incident angle and reflection angle.

| Product | Maximum cross-section | Measurement Results Percent <1 $\mu$m | Percent <0.2 $\mu$m | Gloss According to Tappi |
|---|---|---|---|---|
| A | 4 $\mu$m | 53% | 17% | 33% |
| B | 4 $\mu$m | 52% | 4% | 39% |

Product B, with a low proportion or percent of particles smaller than 0.2 $\mu$m, gives better gloss values than product A.

Within the context of the basic idea behind the invention, the favorable properties of the filler could be further improved by seeing to it that the largest possible proportion of particles—which are smaller than 1 $\mu$m with a corresponding spherical diameter—will be contained herein. Preferably, the mineral fillers according to the invention contain 80–95% by weight of particles which are smaller than 1 $\mu$m with a corresponding spherical diameter and which reveal a maximum diameter or cross-section of 2–3 $\mu$m.

The following examples 2 and 3 will further explain the influence, on the one hand, of particles smaller than 1 $\mu$m and, on the other hand, of particles smaller than 0.2 $\mu$m on various properties of coating papers.

EXAMPLE 2

According to the manner described in Example 1, three products, with the same maximum cross-section, as much as possible, and with the same proportion of particles smaller than 0.2 $\mu$m, as much as possible, but with differing relative amounts of particles smaller than 1 $\mu$m, were produced.

The examination of these products were performed with a paper coating paint for sheet offset printing in the composition given in Example 1 under the experimental and measurement conditions described under Example 1.

| Product | Maximum cross-section | Measurement Results Proportion <1 $\mu$m | Proportion <0.2 $\mu$m | Gloss according to Tappi |
|---|---|---|---|---|
| C | 3 $\mu$m | 58% | 6% | 44% |
| D | 3 $\mu$m | 75% | 8% | 50% |
| E | 2 $\mu$m | 90% | 9% | 47% |

The products D and E, with a rather immaterial change in the amount of particles smaller than 0.2 $\mu$m, but with a greatly increased percentage of particles smaller than 1 $\mu$m, give essentially better gloss values than product C.

EXAMPLE 3

In order further to show how particle sizes below 0.2 $\mu$m cause a deterioration in the gloss, two additional products were provided in addition to the product E according to the invention from Example 2, following the procedure described in Example 1. Here—retaining to the extent possible the same maximum cross-section and, as much as possible, also the same amount of particles smaller than 1 $\mu$m—an amount of particles smaller than 0.2 $\mu$m which would be greatly increased compared to the product E according to the invention from Example 2 was provided.

These products were examined in a paper coating paint for sheet offset printing in the composition described in Example 1, under the experimental and measurement conditions described in Example 1. The following tests were also performed.

Printing Gloss

Printing on paper to be tested by means of a test printing unit. Printing color according to Euroscale 1 R 70 with a printing application of 1.2 g/m$^2$ (full surface). The gloss measurement was performed according to Tappi with 75° incident and reflection angle.

Chipping Test

Printing on paper to be tested and subsequent checking after 15, 30, 60, 120, 300, 600, 900, and 1,800 seconds against a standard art [chromo] paper. The effect of the spreading pigment on the printing dye drying process was tested.

Roughness

Measurement of surface roughness (Parker Print-Surf Unit).

Among other things, a low printing dye composition, coupled with good printing quality, will bring about a slight degree of surface roughness.

Measurement Results

| Product | Maximum cross-section | Percent <1 μm | Percent <0.2 μm | Gloss according to Tappi |
|---------|------------------------|---------------|------------------|---------------------------|
| E | 2 μm | 90% | 9% | 57% |
| F | 2 μm | 90% | 25% | 48% |
| G | 2 μm | 91% | 35% | 17% |

| Product | Printing gloss | Chipping test | Roughness |
|---------|----------------|---------------|-----------|
| E | 70% | 120 sec. | 1.7 μm |
| F | 65% | 300 sec. | 2.0 μm |
| G | 37% | 600 sec. | 2.9 μm |

Product E according to the invention gives a considerably better gloss than products F and G with the greatly increased amounts of particles smaller than 0.2 μm. Likewise, the printing gloss in product E is the highest. The chipping test gave the best values for the chipping time for product E and the values are the best for produce E also with regard to surface roughness.

The filler according to the present invention can be made either by first dry-grinding the filler in the known manner and then by means of classification according to particle size, using wind shifting, to such an extent that it will contain no—at any rate, as few as possible—but at most 15% by weight of particles smaller than 0.2 μm with a corresponding spherical diameter.

The filler according to the present invention can also be made by first wet-grinding the filler in the known manner, followed by drying, and finally by means of classification according to particle size using wind sifting to such an extent that it will contain no—at any rate, as few as possible—but as a maximum 15% by weight of particles which are smaller than 0.2 μm with a corresponding spherical diameter.

Finally, the filler according to the invention can also by made by first of all wet-grinding it in the known manner and then by removing particles smaller than 0.2 μm, with a corresponding spherical diameter, by means off wet-separation, for example, by centrifuging, in the known manner.

It is within the context of the basic idea behind the present invention that the mineral filler can also be made by pure wet-grinding, specifically, in the manner that wet-grinding is so controlled that there will be no—at any rate, as few as possible—but at most only 15% by weight of particles smaller than 0.2 μm with a corresponding spherical diameter.

The production of the mineral filler according to the present invention is described using the example of a natural calcium carbonate in the above Example 1.

The mineral filler according to the present invention can be used particularly advantageously as coating pigments for glossy coating paper and as extenders for glossy lacquers and paints, as is shown in the following Examples 4-6.

EXAMPLE 4

The products A and B, described in Example 1, are tested in a glossy painter's lacquer based on a longoil alkyde resin (70% oil content), in combination with linseed oil-stand oil with regard to the way the gloss and the hazing are influenced. The two products were used in the following composition with a pigment volume concentration (PVK) of about 15%:

540.0 parts by weight alkyd resin with 70% oil content,
70% solution in test gasoline [Benzine],
40.0 parts by weight linseed oil-stand oil,
10.0 parts by weight calcium octoate dry substance, 4%,
10.0 parts by weight dry substance stabilizer,
8.9 parts by weight zinc octoate dry substance, 8%,
2.7 parts by weight soy bean lecthin,
5.3 parts by weight pyrolytically-produced silicic acid, fineness 380 m$^2$/g,
137.5 parts by weight titanium dioxide Rutile,
92.8 parts by weight extender (Products A and B, respectively),
3.2 parts by weight cobalt octoate dry substance, 8%,
8.4 parts by weight lead octoate dry substance 24%,
5.5 parts by weight lacquer-tolerating silicone oil, 1% in toluene,
20.0 parts by weight terpentine oil,
16.0 parts by weight aliphatic hydrocarbon solvent,
10.5 parts by weight methylethylketoxim skin prevention agent, 55%,
44.5 parts by weight test gasoline.

The paints were produced in a pebble mill, using glass pebbles (diameter 2 and 3 mm, mixed at a ratio ff 1:1) as grinding bodies. The ratio between grinding material and glass pebbles was 1:1.5. After 15 minutes of grinding, the glass pearls are separated by running the grinding material through a 25 μm screen.

The lacquers were so applied to glass plates by means of a split spreader five days after production that films resulted with a dry film thickness of 40±4 μm, on which the gloss was measured by an angle of 20° (Gardner-Multiangle-Glossmeter) and where the hazing was evaluated.

| | Gloss Measurement Film drying time at 23° C. | | | |
|---------|-------|--------|---------|---------|
| Product | 1 day | 1 week | 2 weeks | 4 weeks |
| A | 65% | 55% | 49% | 46% |
| B | 76% | 68% | 65% | 63% |

Hazing

The evaluation was accomplished visually with the help of a standard series, during which stage the number 10 means hazing-free mirror gloss while the number 0 means a dull matte surface.

| | Film drying time at 23° C. | | |
|---------|--------|---------|---------|
| Product | 1 week | 2 weeks | 4 weeks |
| A | 6 | 5-6 | 5 |
| B | 8-9 | 8 | 8 |

EXAMPLE 5

The products A and B, described in Example 1, were tested for the way in which the gloss is influenced in a silk-glossy dispersion paint based on a pure acrylate binder. The two products were used in the following composition with a PVK of about 35%:

110.0 parts by weight 1,2-propylene glycol,
5.0 parts by weight defoamer,
16.5 parts by weight dispersion and wetting agent solution on a base of low-molecular weight polyacrylic acid, about 25%,
2.0 parts by weight preservative on a base of chlorinated acid-amide/fluoride,
3.0 parts by weight ammonia, 25%,
210.0 parts by weight titanium dioxide Rutile,
140.0 parts by weight extender (products A and B, respectively),
7.0 parts by weight polyurethane thickener solution, 5%, in water,
19.5 parts by weight glycol mixture to promote film formation,
487.0 parts by weight pure acrylate dispersion, about 46.5% solids.

The components of the paints were dispersed for 20 minutes with a disc speed of 22 m/sec, using a water-cooled dispersion vessel.

The paints were so applied to glass plate by means of split spreaders 24 hours after production that films resulted with a dry film thickness off 60–65 μm, on which the gloss was measured at an angle of 85° (Gardner-Multiangle-Glossmeter).

| Product | Gloss Measurement Film drying time at 23° C. | | | |
|---|---|---|---|---|
| | 1 day | 1 week | 2 weeks | 4 weeks |
| A | 76% | 69% | 66% | 62% |
| B | 85% | 78% | 73% | 71% |

EXAMPLE 6

The products E and G, described in Example 3, were tested for the way in which the gloss and the hazing are influenced in a glossy enamel on a base of an alkyde-/melamine-resin combination. The two products were included in the composition below, with a PVK of about 18%:

500.0 parts by weight short-oil alkyde resin, modified with saturated, branched, synthetic fatty acids, 60-% solution in xylene/ethylglycol,
160.0 parts by weight nonplastified, medium-reacting melamine resin, 55-% solution in isobutanol,
3.0 parts by weight calcium octoate dry substance, 4%,
15.0 parts by weight organic derivative of a special magnesium montmorillonite (gelling agent), 10% swelling in xylene,
4.0 parts by weight pyrolytically produced silicic acid, fineness 380 m²/g,
150.0 parts by weight titanium dioxide Rutile,
101.3 parts by weight extender (product E, respectivly, G),
4.0 parts by weight lacquer-tolerating silicone oil, 1-%, in toluene,
8.0 parts by weight butanol,
6.0 parts by weight glycol acid-n-butylester.

The lacquers were produced on a three-roller mill.

One day after production, the lacquers were so applied on glass plates by means of a split spreader that films resulted with a dry film thickness of 35±3 μm, on which the gloss was measured at angles of 20° and 60° (Gardner-Multiangle-Glossmeter) and where the hazing was evaluated. The hazing was evaluated with the help of a standard series where the number 10 signifies hazing-free mirror gloss and the number 0 represents a dull-matte surface.

The tests were performed as follows.

1. After the baking of the lacquer films baking conditions: 30 minutes at 403 K (130° C.)

| Product | Gloss | | Hazing |
|---|---|---|---|
| | 20° angle | 60° angle | |
| E | 86% | 94% | 10 |
| G | 47% | 81% | 2 |

2. After additional bakeover of lacquer films Overburn conditions: 2 hours at 473 K (200° C.)

| Product | Gloss | | Hazing |
|---|---|---|---|
| | 20° angle | 60° angle | |
| E | 52% | 82% | 5 |
| G | 13% | 49% | 0 |

The invention in particular reveals the following advantages.

Using the mineral filler according to the present invention provides for generally improved properties of the products containing those fillers. In particular, when the mineral filler according to the invention is used in spreading pigment for coated papers, a higher gloss and printing gloss are obtained. Furthermore, outstanding shipping times and optimum surface roughness, that is to say, a low printing paint or dye consumption coupled with good printing quality are achieved. In paints and lacquers, the mineral filler according to the invention, especially natural calcium carbonate, gives a higher gloss and reduced hazing formation.

The mineral filler according to the present invention further makes it possible to produce suspensions for the paper industry with a high solid-material content (e.g., 70–85% by weight). This is particularly advantageous in making high-solid coatings.

Having thus described our invention, what we claim as new and desire to secure by Letters Patent is:

1. Mineral filler selected from the group consisting of natural calcium carbonate, precipitated calcium carbonate, dolomite, kaolin, talcum, barium sulfate, quartz, and mixtures thereof, characterized by being prepared by grinding or by classification or by both according to particle size, having a maximum cross-section of 2–3μ with a corresponding spherical diameter, containing at most 15 percent by weight of particles which are smaller than 0.2μ with a corresponding spherical diameter, and having 80–95 percent by weight of particles which are smaller than 1μ with a corresponding spherical diameter.

2. Mineral filler according to claim 1 characterized by being prepared by means of grinding and containing no more than 3–12% by weight of particles which are smaller than 0.2 μm with a corresponding spherical diameter.

3. Mineral filler according to claim 1 characterized by being prepared by means of grinding and containing no more than 8% by weight of particles which are smaller than 0.2 μm with a corresponding spherical diameter.

4. Mineral filler according to claim 1 characterized by containing no particles which are smaller than 0.2 μm.

5. Mineral filler according to claim 1 or 2 or 3 or 4 being natural calcium carbonate.

6. Glossy paper coating composition containing as a coating pigment therein, the filler of claim 1.

7. The composition of claim 6 wherein said pigment is employed in suspension having a solids content of about 70-85% by weight.

8. The composition of claim 7 being a high-solids content coating.

9. Glossy lacquer or paint containing as an extender, the filler of claim 1.

10. The lacquer or paint of claim 9 wherein said extender is employed in suspension having a solids content of about 70-85% by weight.

* * * * *